United States Patent [19]

Bondioli

[11] Patent Number: 5,169,358

[45] Date of Patent: Dec. 8, 1992

[54] PROTECTIVE CASING FOR THE END YOKE OF A TRANSMISSION SHAFT DESCRIPTION

[76] Inventor: Edi Bondioli, Via Gina Bianchi No. 18, Suzzara, Mantova, Italy

[21] Appl. No.: 718,340

[22] Filed: Jun. 19, 1991

[30] Foreign Application Priority Data

Jun. 22, 1990 [IT] Italy .................................. 9432 A/90

[51] Int. Cl.$^5$ ............................................. F16D 3/84
[52] U.S. Cl. .................................. 464/172; 74/609; 403/93; 464/901
[58] Field of Search ............... 464/172, 162, 170, 171, 464/901; 403/23, 51, 288, 11, 12, 95, 97, 92, 93; 74/609, 612, 613

[56] References Cited

U.S. PATENT DOCUMENTS

| | | |
|---|---|---|
| 3,044,279 | 7/1962 | Atkinson ............................ 464/172 |
| 4,447,033 | 5/1984 | Jaumann et al. ................... 403/93 X |
| 4,501,573 | 2/1985 | Bondioli ............................. 464/172 |
| 4,687,367 | 8/1987 | Bondioli . |
| 4,747,804 | 5/1988 | Benzi .................................. 464/170 |
| 4,890,948 | 1/1990 | Bondioli ............................. 403/23 |

*Primary Examiner*—Daniel P. Stodola
*Assistant Examiner*—Tony A. Gayoso
*Attorney, Agent, or Firm*—McGlew and Tuttle

[57] ABSTRACT

A protective casing (33) for the end yoke (31) of a transmission shaft with locking pin (29) and a rotating sleeve (39) for unlocking the aforementioned pin (29), is characterized in that it includes an external sleeve (45) that does not rotate with the aforementioned yoke, covers the rotating sleeve (39), and includes a mechanism (65 and 67) designed to operate the aforementioned rotating sleeve (39). The locking pin (29) can easily be released from the exterior, and the protective casing remains stationary while the yoke is rotating.

6 Claims, 5 Drawing Sheets

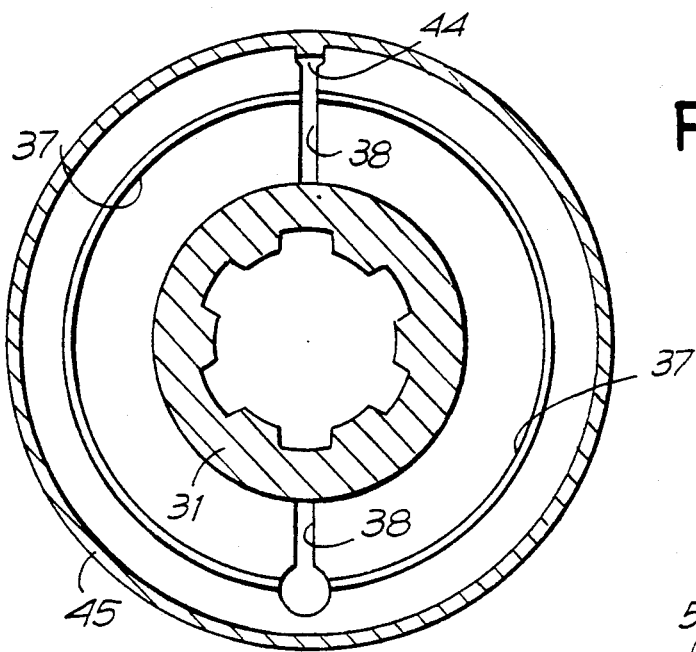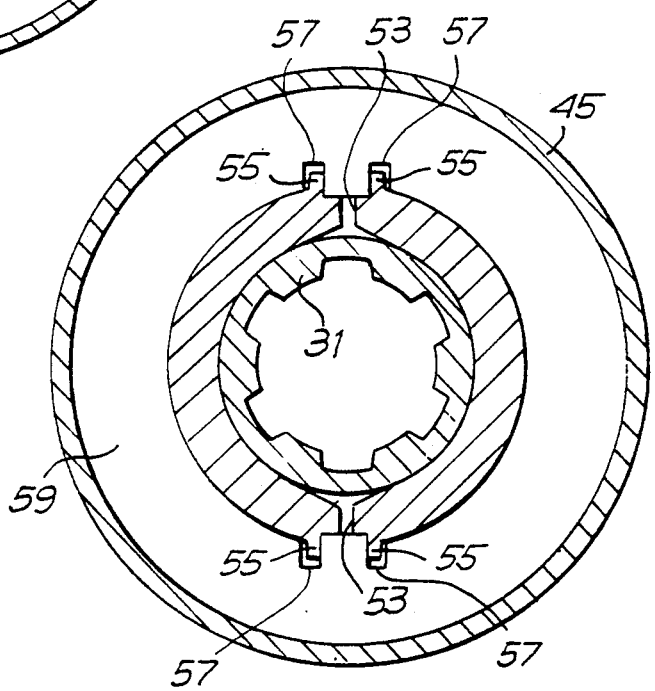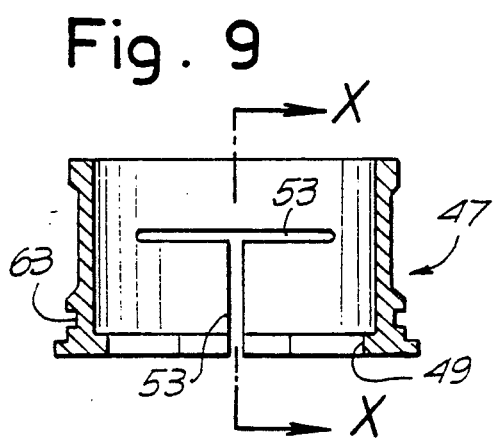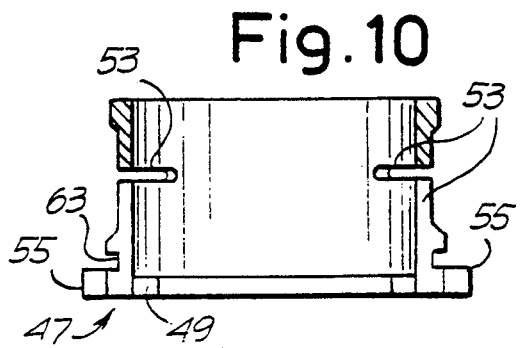

Fig. 11
Fig. 12
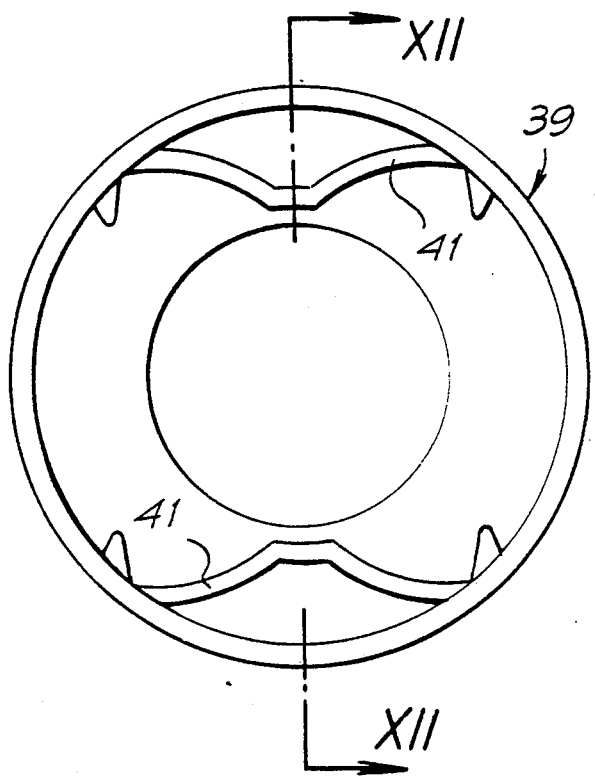
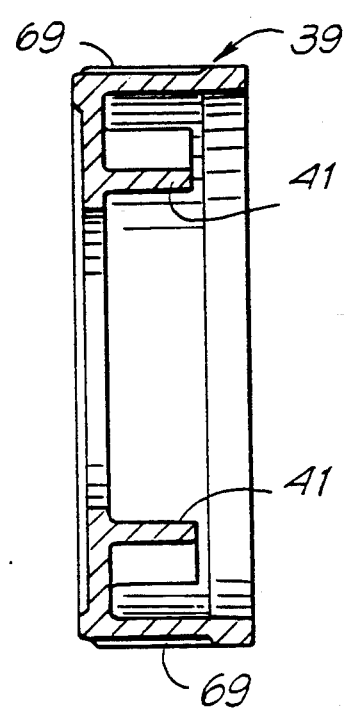
Fig. 14
Fig. 13
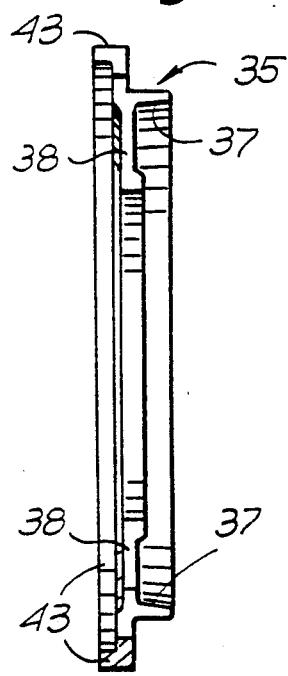
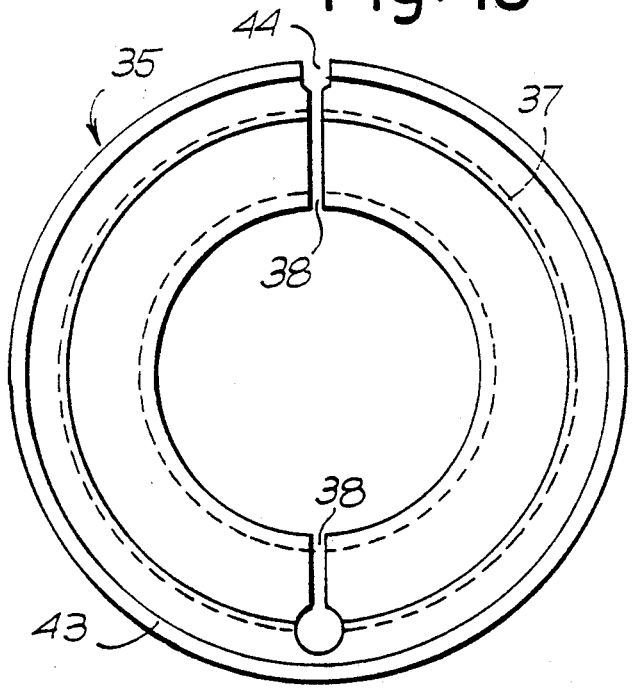

PROTECTIVE CASING FOR THE END YOKE OF A TRANSMISSION SHAFT DESCRIPTION

FIELD OF THE INVENTION

The invention relates to the protection of a mechanical transmission, and in particular, the protection of the end yoke of a transmission shaft.

BACKGROUND OF THE INVENTION

Normally, a drive shaft (on a tractor, for example) and the end yoke of a transmission shaft are coupled via a transverse locking-pin, which, once connected, is uneven in shape and has projections that constitute a danger to anyone approaching the shaft whilst it is rotating, unless it is fitted with some form of protective casing.

Several types of protective casing have been designed to avoid this danger. According to one particularly simple kind of protective casing, the end yoke and locking pin are covered by a cowling attached to the machine from which the drive shaft projects. This, however, has considerable disadvantages, due, for example, to the fact that it requires holes being made in the machine in suitable positions so that the protective cowling can be attached. Moreover, the locking pin is very difficult to reach and requires the cowling being bent.

A type of protective casing is described in Patent GB-B-2102526 (corresponding to U.S. Pat. No. 4,501,573) which includes two half-casings that couple in such a way as to cover the locking pin, and rotate with the drive shaft. A conical casing covers these two half-casings and the yoke on the relevant joint. This system is rather complicated to unlock. In fact the casing has to be dismantled before the shaft can be disconnected by removing the locking pin.

A type of protective casing for the locking pin is known from Patent EP-B-O 201 464, (corresponding to U.S. Pat. No. 4,687,367), including a rotating sleeve that is internally provided with a specially shaped piece that moves the locking pin and thus disconnects the transmission shaft. This sleeve, which is attached to and turns with the transmission shaft, is highly practical in use as it covers the locking pin thus eliminating the unevenness and projections on the rotating shaft, and it also permits the transmission shaft to be disconnected without having to dismantle the protective casing. However, the amount of protection offered is limited, since the sleeve rotates with the shaft, i.e. it does not constitute a fixed protective casing.

SUMMARY AND OBJECTS OF THE INVENTION

The object of the present invention is a protective casing of the above mentioned type, that adequately protects the end yoke of a transmission shaft and its locking pin, and not only eliminates any unevenness, but covers all rotating parts and permits the shaft to be disconnected extremely quickly without dismantling the protective casing.

This, and other objects that will become clear to persons skilled in the art by reading the description that follows. The objects are attained according to the invention, by a protective casing for the end yoke of a transmission shaft fitted with a locking pin and rotating sleeve for unlocking the aforementioned pin, characterized in that it includes an external sleeve that does not rotate with the aforementioned yoke, covers the rotating sleeve, and is fitted with means for operating the aforementioned rotating sleeve.

The external sleeve covers the rotating sleeve, which is attached to and rotates with the yoke to which it is attached. The external sleeve is held in a fixed position, thus ensuring that whoever is operating the machine is entirely safe. When the shaft is stopped so the it can be disconnected from the drive shaft, the protective casing neither requires dismantling nor bending in order to gain access to the rotating sleeve. The external sleeve is in fact fitted with means that enable the operator to turn the rotating sleeve from the exterior of the protective casing. In practice, these means can consist of an elastic tongue with grooves that couple with correspondingly shaped projections on the rotating sleeve. Bending the elastic tongue from the exterior causes its grooves to engage with the projections on the rotating sleeve, and thus the rotating sleeve can be moved so as to unlock the pin. Evidently, the grooves and projections which permit the external sleeve to couple with the rotating sleeve can be of any shape that is suitable for the purpose. They can be actual grooves, or even cavities of a different shape that are designed to engage with projections on the rotating sleeve, or vice-versa. In practical terms, all that is required is that the tongue and rotating sleeve have complementary shaped surfaces that are designed to form a coupling between the tongue and the rotating sleeve.

In one possible form of construction, the external sleeve is supported by a disc-shaped support element which fits into a groove in the end yoke and can have an annular rim on which the rotating sleeve rests. The disc-shaped support element can be connected to the external sleeve in such a way that there is no reciprocal rotation between the two parts, so that the disc-shaped support element rotates in the groove in the end yoke and forms a sliding support for the external sleeve.

In an advantageous improved embodiment, the external sleeve is also supported by a support element that fits into a groove in the end yoke, and forms an extension of the aforementioned protective casing so as to partly cover the shaft coupled to the aforementioned end yoke. This support element thus has two functions: that of supporting the external sleeve, and that of providing extra protection for the shaft. To this end, it is an advantage to fit means between the external sleeve and the support element that are designed to prevent the two parts from rotating reciprocally. Advantageously, the support element can also serve to keep the rotating sleeve axially in position on the end yoke.

BRIEF DESCRIPTION OF THE DRAWINGS

The invention will be better understood by a reading of the description and drawings that follow, which show a practical non-limiting example of the invention, in which:

FIGS. 4, 5, and 6 are transverse cross-sections from IV—IV, V—V, and VI—VI respectively in FIG. 3;

FIG. 9 is a lengthwise cross-section from IX—IX in FIG. 10, of another part of the protective casing;

FIG. 10 is a lengthwise cross section from X—X in FIG. 9;

FIG. 11 is a front elevation of the ring that moves the locking pin;

FIG. 12 is a transverse cross-section from XII—XII in FIG. 11;

FIG. 13 is a front elevation of another part of the protective casing according to the invention; and FIG. 14 is a cross-section from XIV—XIV in FIG. 13.

DETAILED DESCRIPTION OF THE PREFERRED EMBODIMENT

Figure 1:
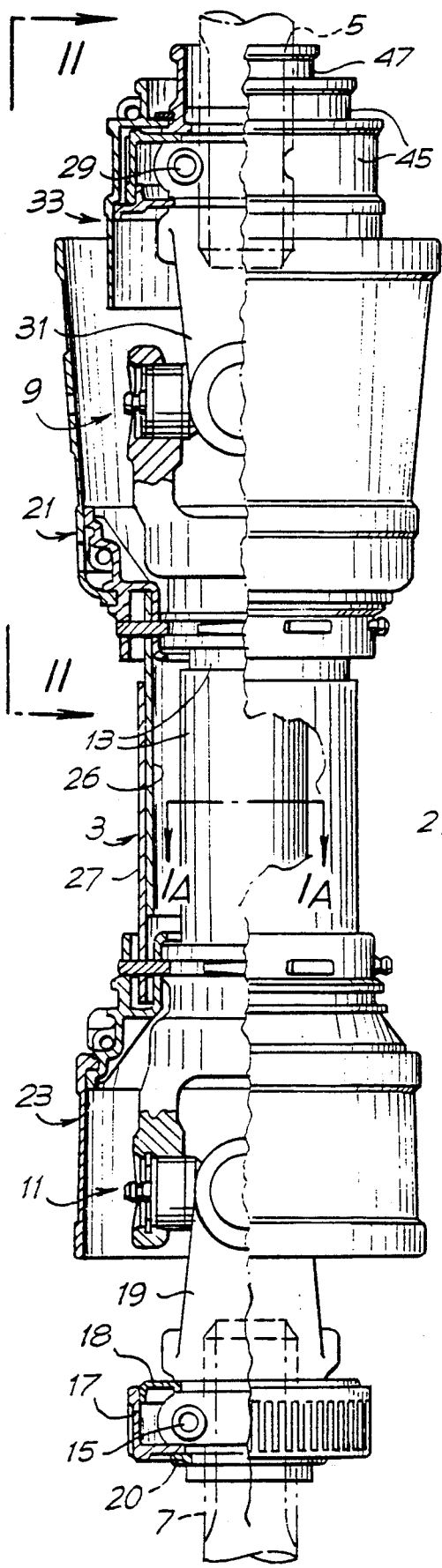
FIG. 1 is a side elevation and part lengthwise cross-section of a transmission shaft with a protective casing according to the invention.
Figure 1A:
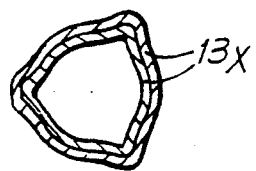
FIG. 1A is a cross-section from 1A—1A in FIG. 1.

FIG. 1 shows a transmission shaft (1) with a protective casing, indicated in its entirety by (3). The transmission shaft (1) is connected to two grooved shafts (5 and 7), one of which (shaft 5, for example) is the drive shaft, and the other is the driven shaft. The transmission shaft (1) has two universal joints, indicated in their entirety by 9 and 11, and a central telescopic section formed by two tubular elements (13) coupled by a coupling which is determined by the particular geometry (indicated by 13X) of the two elements (13) (See FIG. 1A). The transmission shaft (1) is connected to the driven shaft (7) by means of a grooved coupling and a locking pin (15) with a rotating sleeve (17), of the type described in Patent EP-B-O 201 264 (corresponding to U.S. Pat. No. 4,687,367) for example. The pin (15) connects the shaft (7) to a yoke (19) on the universal joint (11), in such a way that it can be removed. The universal joints (9 and 11) are protected by cowlings, indicated in their entireties by (21 and 23), respectively, which are linked together by two telescopic tubes (26 and 27).

Figure 3:
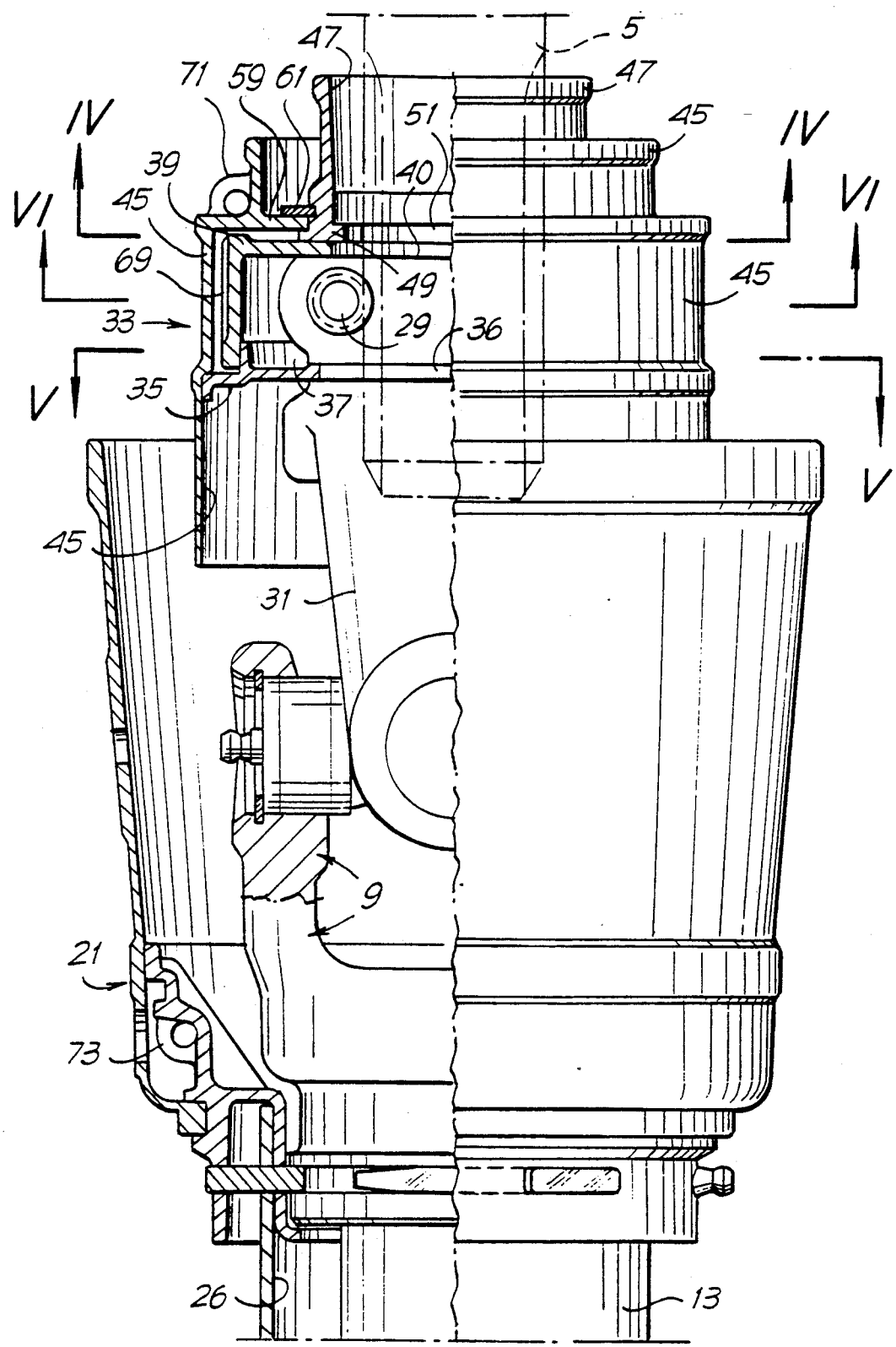
FIG. 3 is and enlarged detail of FIG. 1.

In a similar way to the way the driven shaft (7) is connected to the transmission shaft (1), there is a locking pin (29) on one end yoke (31) of the universal joint (9) between the drive shaft (5) and the transmission shaft (1). According to the invention, there is a special protective casing, indicated in its entirety by (33), that covers the pin (29) and the end yoke (31). The protective casing (33) includes, as is shown in detail in the enlarged section in FIG. 3, a first disc-shaped support element (35) (shown separately in FIGS. 13 and 14) that fits into a groove (36) in the end yoke (31). In order to make assembly of the disc-shaped support (35) easier, the latter has a out (38) (see FIG. 13) which makes it elastic and makes it possible to fit it over the yoke.

The disc-shaped support (35) has an annular flange (37) on which a rotating sleeve (39) that operates the locking pin (29) rests. The interior of the rotating sleeve (39) (see FIGS. 11 and 12) has specially shaped parts (41) that, when the sleeve is rotated with respect to the pin (29), move the pin parallel to its own axis and thus disconnect the transmission shaft (1) from the drive shaft (5). The rotating sleeve (39) has a flanged section (39A) which forms a rim that contacts a shoulder (40) on the yoke (31), in such a way that the aforementioned rotating sleeve (39) is supported by the flanged section (39A) and the annular flange (37) on the disc-shaped support (35).

Figure 8:
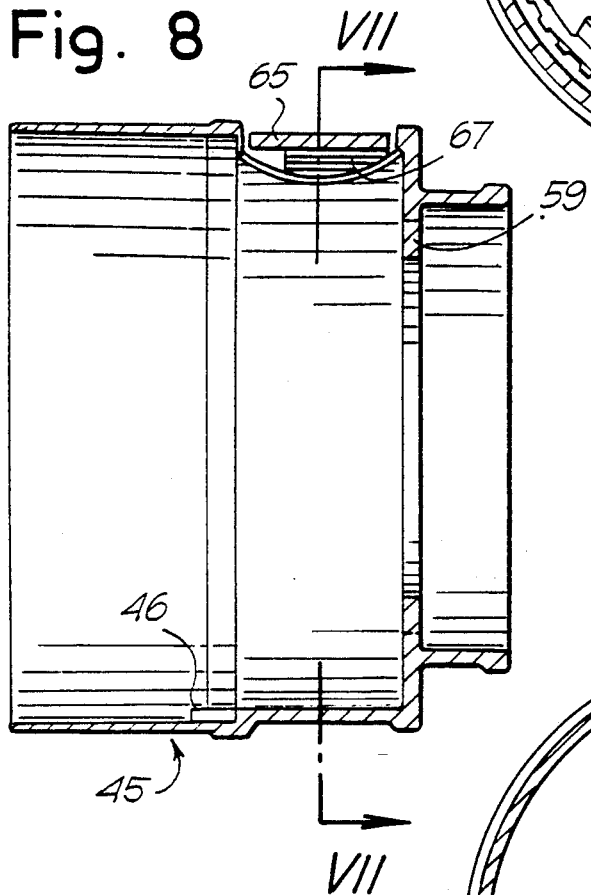
FIG. 8 is a cross-section from VIII—VIII in FIG. 7.
Figure 6:
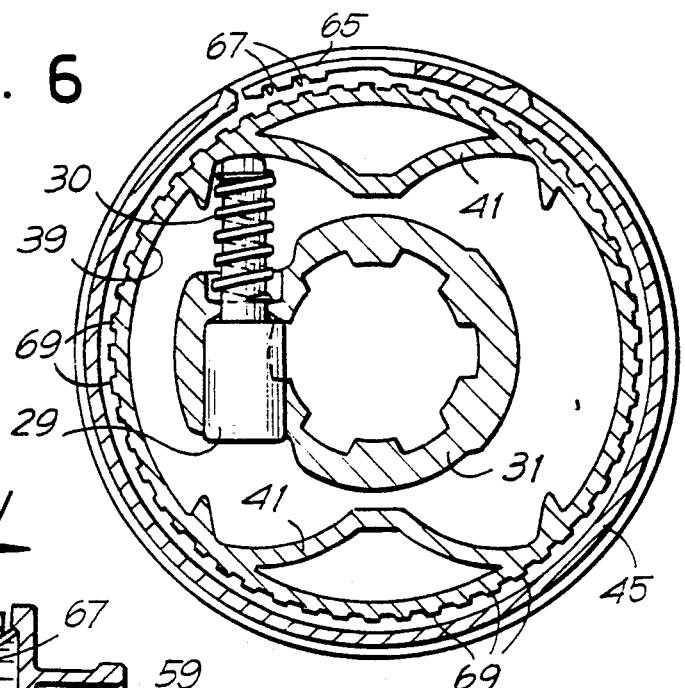
Figure 7:
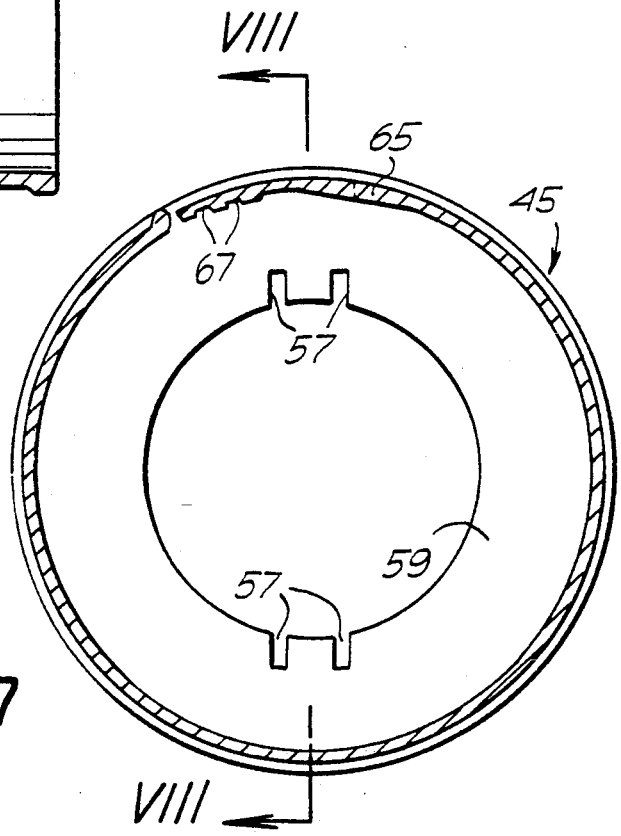
FIG. 7 is a transverse cross-section from VII—VII in FIG. 8, showing one element of the protective casing according to the invention.

Along the edge of the disc-shaped support (35), there is a rim (43) forming a first rest for an external sleeve (45), as shown in detail in FIGS. 7 and 8. A notch (44) (see FIG. 13) is provided in the rim (43), into which an element (46) (see FIG. 8) on the external sleeve fits, in order to prevent rotation between the disc-shaped support (35) and the aforementioned external sleeve (45).

Aside from the rim (43) on the disc-shaped support (35), the external sleeve (45) also rests on a support element (47) that is shown in detail in FIGS. 9 and 10. The support element (47) has an annular flange (49) that fits into a groove (51) in the end yoke (31). In order that the support element (47) can be assembled, the latter is provided with two 'T' shaped cuts (53) which make the support element elastic enough for the rim (49) to snap into the groove (51) in the yoke (31). The support element (47) is also fitted with two pairs of elements (55), particularly shown in the cross-section shown in FIG. 4, that are inserted into corresponding slots (57) in a diaphragm (59) on the external sleeve (45), in such a way as to prevent rotation between the external sleeve (45) and the support element (47). The support element (47) and the external sleeve (45) are axially connected by an elastic ring (61) (see FIG. 3) which fits into a groove (63) in the support element (47).

Figure 2:
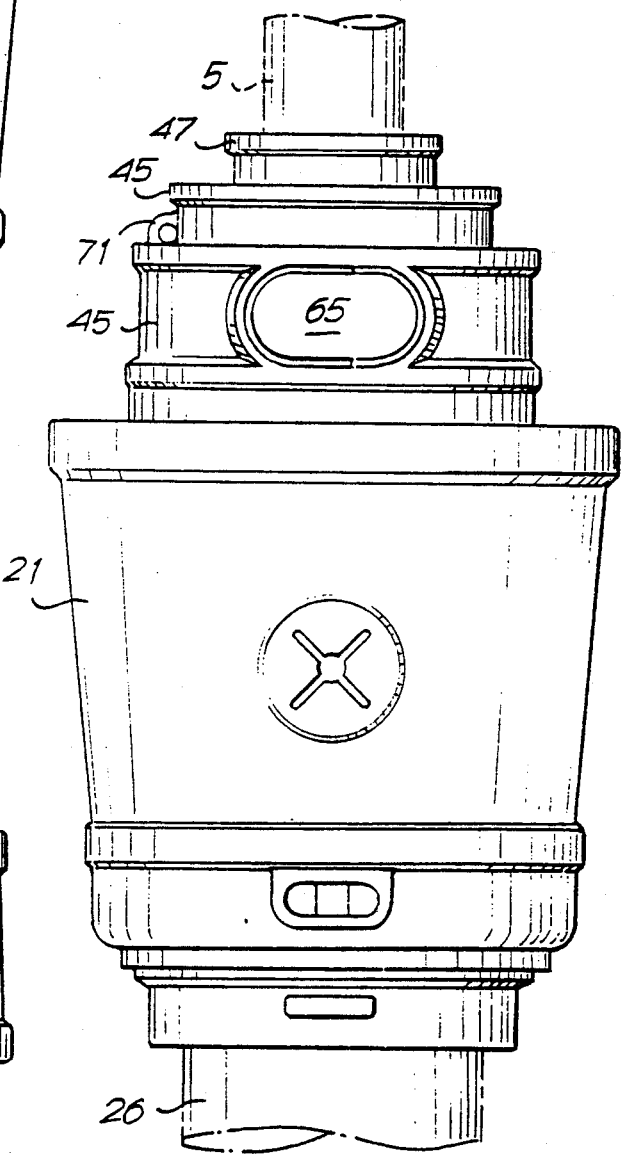
FIG. 2 is a view from II—II in FIG. 1.

As shown in FIGS. 2, 7, and 8, the external sleeve (45) is fitted with an elastic tongue (65) that is accessible from the exterior and yielding towards the interior, whose internal face is fitted with a number of grooves (67). These grooves (67) are designed to engage with a correspondingly shaped series of projections (69) on the cylindrical surface of the rotating sleeve (39), for purposes which are later explained.

The external sleeve (45) is also fitted with an eyelet (71) designed to be connected to a chain, or similar item, that prevents the sleeve being rotated by the transmission shaft.

When the transmission shaft (1) is connected to the drive shaft (5) via the locking pin (29), the yoke (31), pin (29), and rotating sleeve (39) all rotate together. The external sleeve (45) is prevented from rotating by the chain attached to the eyelet (71). The support elements (47 and 35) are attached to the external sleeve (45) in such a way as to prevent them from rotating in respect of the sleeve (45), and thus the assembly formed by these elements (35, 45, and 47) is stationary and supported on the rotating yoke via the internal rim of the disc-shaped element (35) which is inserted in the groove (36), and by the rim (49) of the support element (47) which is also inserted in the groove (51). As the external sleeve (45) extends inside the cowling (21) that covers the universal joint (9), which cowling is in turn prevented from rotating by a chain connected to an eyelet (73) attached to the cowling, the entire universal joint (9) is covered by a protective casing that does not rotate.

When the transmission shaft (1) is to be disconnected from the drive link (5), it is neither necessary to dismantle the protective casing nor bend it in order to gain access to the locking pin (29). All that this in fact requires is pressing the elastic tongue (65) with one finger thus bending it towards the interior of the external sleeve (45) until the grooves (67) make contact with the corresponding projections (69) on the rotating sleeve. The grooves (67) and the projections (69) form a coupling which enables the operator to rotate the rotating sleeve (39), together with the external casing formed by the external sleeve (45), to press the locking pin (29) against the action of the counter-spring (30), and thus disconnect the yoke (31) (and thus the transmission shaft (1)) from the drive shaft (5). Once the operator releases the tongue (67), its elastic characteristics return it to the rest position shown in FIGS. 7 and 8, i.e. alignment with the cylindrical external surface of the external sleeve (45).

As can be seen particularly from FIG. 1, the rotating sleeve (39) can also be used without the protective casing formed by the external sleeve (45). As shown in the aforementioned FIG. 1, rotating sleeve (17) is precisely the same as sleeve (39), and can be fitted by simply replacing the disc-shaped support element (35) and the support element (47) with respectively a disc (18) and an elastic ring (20), which fit into grooves corresponding to the grooves (36 and 51) on the yoke (31), in such a way that the same rotating sleeve and the same yoke can be used both with or without the aforementioned protective casing.

It is to be understood that the drawings show but one example as a practical demonstration of the invention, whose forms and design can be varied without being beyond the scope of the concept on which the present invention is based. The reference numbers in the claims are merely there to aid the reference of the claims to the description and Figures, and do not limit the scope of the protection represented by the claims.

I claim:

1. A protective casing for an end yoke of a transmission shaft, comprising:
    a locking pin connected to said end yoke of said transmission shaft, said locking pin including means for biasing said locking pin into a locked position for locking said end yoke to one of a drive shaft and a drive shaft;
    rotating inner sleeve including cam means for acting on said locking pin for moving said locking pin into an unlocked position, said inner sleeve being supported by said end yoke;
    an external sleeve coaxial with said inner sleeve, said external sleeve being supported for preventing rotation of said external sleeve upon rotation of said end yoke and said inner sleeve;
    activation means including an elastic tongue provided on said external sleeve, said elastic tongue having an interior shaped surface and a complementary shaped surface being provided on an exterior circumferential portion of said inner sleeve for forming a coupling between said external sleeve and said inner sleeve for rotating said inner sleeve for activating said cam means of said inner sleeve for moving said locking pin into said unlocked and said locked position by movement of said cam means relative to said locking pin.

2. A protective casing as in claim 1, wherein said external sleeve is supported by a support element that fits into a groove in said end yoke and forms an extension of protective casing so as to partly cover said shaft coupled to said end yoke.

3. A protective casing as in claim 2, wherein said support element prevents inner sleeve from moving in an axial direction on said end yoke.

4. A protective casing as in claim 1, wherein said external sleeve is fitted with an eyelet that connects to a chain designed to prevent said external sleeve from being rotated.

5. A protective casing for an end yoke of a transmission shaft comprising:
    a locking pin connected to said yoke and biased into a locked position for locking said yoke to one of a drive shaft and a driven shaft;
    an inner sleeve surrounding said end yoke and said locking pin, said inner sleeve being supported by said end yoke and being rotatable with said end yoke, said inner sleeve including caming means for moving said locking pin into an unlocked position upon rotation of said inner sleeve relative to said end yoke;
    an external sleeve positioned coaxially with said inner sleeve and supported for preventing rotation of said external sleeve with said inner sleeve and said end yoke; and, activation means including an elastic tongue formed as part of said external sleeve, said elastic tongue having an interior shaped surface for engaging a corresponding complementary exterior circumferential shape surface on said inner sleeve to form a coupling for coupling said external sleeve with said inner sleeve for rotation of said inner sleeve with said external sleeve to move said caming means for moving said locking pin into an unlocked position for rotation of said inner sleeve upon rotation of said external sleeve.

6. A protective casing according to claim 5, wherein said activation means includes an elastic tongue formed as part of said external sleeve, said elastic tongue including an interior shaped surface for engaging a corresponding complimentary exterior shape surface on said inner sleeve to form a coupling for rotation of said inner sleeve upon rotation of said external sleeve.

* * * * *